March 4, 1969 KATSUHIKO OGURI 3,430,744
CLUTCH RELEASE MOTOR WITH AUTOMATIC
COMPENSATOR FOR DISC WEAR
Filed Sept. 22, 1967
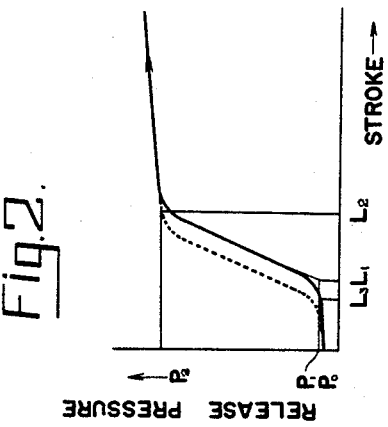
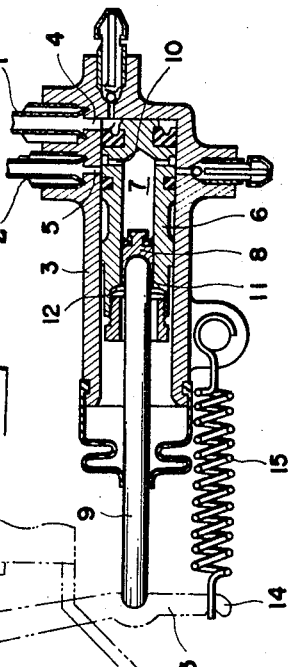
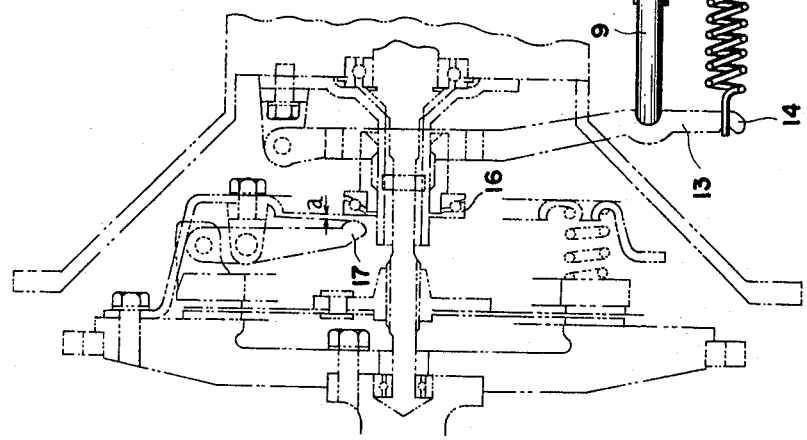
KATSUHIKO OGURI,
INVENTOR
By Wenderoth, Lind and Ponack
Attorneys / 3,430,744
CLUTCH RELEASE MOTOR WITH AUTOMATIC COMPENSATOR FOR DISC WEAR
Katsuhiko Oguri, Kariya, Japan, assignor to Aisin Seiki Kabushiki Kaisha, Kariya, Aichi Prefecture, Japan
Filed Sept. 22, 1967, Ser. No. 669,887
U.S. Cl. 192—111
Int. Cl. F16d 11/00, 13/60, 13/44
1 Claim

ABSTRACT OF THE DISCLOSURE

Apparatus responsive to variation of the load of release relative to the stroke of the pressure rod of a clutch and, detecting thereby the amount of the wear of a friction disc, is adapted to adjust the clearance between the release bearing and the pressure lever, so as to automatically compensate for the wear of the friction disc.

---

In conventional friction clutch for a motor vehicle, upon wear of the friction disc, the free end of a pressure lever would be moved toward the release bearing, whereby the amount of the clearance therebetween would be gradually reduced and, if the clearance becomes substantially smaller than the preset amount, the clutch pressure lever is liable to abut against the release bearing earlier, so that there would be tendency of disengaging the clutch earlier. Under such condition, due to decrease of the load on the clutch, there would frequently occur slipping of the clutch, whereby causing undesirable increasing wear of the friction disc. To cope with such disadvantage, heretofore, it has been practised to effect manual adjustment of said clearance by manipulating an adjusting screw.

It is the primary object of the present invention to provide an improved apparatus for automatically compensating for the wear on the friction disc of the clutch, eliminating the necessity of any manual adjustment for the purpose.

Other objects and advantages of the invention will become more apparent from the following detailed description taken in conjunction with the accompanying drawings, wherein:

FIGURE 1 is a longitudinal section of the apparatus according to the present invention, showing the connection thereof with a clutch friction disc; and FIGURE 2 is a diagram showing the load of release relative to the stroke of the pressure rod of the clutch.

Referring to FIG. 1, showing an embodiment of this invention, 1 and 2 designate oil pipes from a clutch master cylinder (not shown) leading to a control cylinder 3, and 4 and 5 are oil ports connecting the inner bore of said control cylinder 3 with the oil pipes 1 and 2, respectively. In the control cylinder 3, there is inserted a tubular main piston 6, which in turn encloses an auxiliary piston 8 having a pressure rod 9, all of which parts being concentrically arranged. 10 is an oil port leading the pressure oil from the oil pipe 2 into the central bore 7 of the main piston 6. In said bore 7, there is provided a coned disc spring 12 as mounted in an annular recess 11 provided at the position in the vicinity of the left-hand end portion of the main piston 6, as shown. The free end of the pressure rod 9 is abutting against a release fork 13, and the control cylinder 3 is connected with the free end portion 14 of the release fork 13 by means of a tension spring 15, which spring having a tendency of normally maintaining the pressure rod 9 retracted to its initial position, i.e., rightwardly as viewed in FIG. 1.

Referring now to FIG. 2, showing the load of release relative to the stroke of the pressure rod 9, it is assumed that the load acting upon the pressure rod when the stroke thereof is zero is derived from the load of the spring 15 only, i.e., $P_0$. Upon stepping down a clutch pedal (not shown), pressure oil from the clutch master cylinder is forced through the pipes 1 and 2, and the pressure oil passing through the port 4 will press the main piston 6 leftwardly (in FIG. 1). Owing to said movement of the main piston 6, the port 5 will be brought into communication with the port 10 in the main piston 6, so that the pressure oil from the master cylinder through the port 5 presses the auxiliary piston 8 leftwardly. It is to be understood that the diameter of said auxiliary piston 8 is so determined that the same will not be moved as acted by the load of the spring 15 only against the said oil pressure fed through the port 10, and that the leftward movement of the auxiliary piston 8 is prevented by means of the coned disc spring 12, so that there is no relative movement of the main piston 6 and the auxiliary piston 8. Thus, the auxiliary piston 8 and the pressure rod 9 will be moved in unison leftwardly according to the movement of the main piston 6. According to said movement of the pressure rod 9, a release bearing 16 associated with said release fork 13 will be moved leftwardly in FIG. 1, thereby reducing the clearance $a$ between the release bearing 16 and a pressure lever 17 of the clutch. When said clearance $a$ becomes zero, in other words, when the release pressure reaches point $L_1$, the port 10 in the main piston 6 will be closed by the inner wall of the control cylinder 3. At release pressure of $L_1$, the release pressure will be rapidly increased, tending to retract the auxiliary piston 8 rightwardly (in FIG. 1), but the auxiliary piston can not be retracted owing to the closure of said port 10, so that the pressure rod 9 will be compelled to be moved leftwardly, thereby disengaging the clutch. The above mentioned function of the apparatus of this invention occurs when there is not any appreciable wear of the friction disc of the clutch, whereas in case the clearance $a$ becomes smaller due to the wear of the friction disc of the clutch the release characteristics would take the dotted line condition shown in FIG. 2, which will be described below.

At the point $L_3$, just before approaching the point $L_1$, the release pressure will be rapidly increased, so that the port 10 is yet in communication with the port 5 and the reaction of the pressure rod 9 will be larger than the pressure of the auxiliary piston 8 plus the resistance of the coned disc spring 12. Consequently, the pressure rod 9 remains at the position $L_3$, and the main piston 6 only will be moved leftwardly and, when the amount of release reaches the point $L_1$, the port 10 will be closed. Thus, as the chamber 7 confined by the auxiliary piston 8 and the main piston 6 will be completely sealed, the main and auxiliary pistons 6 and 8 are moved leftwardly as acted by the pressure oil from the master cylinder, thereby disengaging the clutch. During the period of movement of the main piston 6 from the point $L_3$ to the point $L_1$, the auxiliary piston 8 is not moved at all, resulting in desired compensation for the wear of the friction disc corresponding to $L_1$–$L_3$.

The coned disc spring 12 securely mounted to the main piston 6 is also so designed that the pressure rod 9 may be moved rightwardly if it is pressed by pressure slightly greater than $P_1$ (release pressure relative to the amount of release $L_1$), but that the pressure rod 9 cannot be moved leftwardly unless it is acted upon by considerably greater pressure (greater than 100 kg.). Such condition is deemed necessary in order to prevent the pressure rod 9 from being moved rightwardly by the action of the tension spring 15, when there happens any leakage of oil, and in order to prevent the auxiliary piston 8 from being moved leftwardly when the pressure in the chamber 7 exceeds the pressure $P_1$.

In a friction clutch conventionally used in a motor vehicle, heretofore, it has been practised upon appreciable wear of the clutch friction disc to make manual adjustment of the clearance between the release bearing 16 and the pressure level 17 the worker in charge will have to crawl under the chassis of the vehicle to manipulate a spanner and other hand tools. With the provision of the friction clutch equipped with the apparatus for automatic compensation for the wear of the friction disc according to the present invention, it will be seen that such manual adjustment may be wholly dispensed with.

What I claim is:

1. In combination with a friction clutch equipped with a device for adjusting the clearance between a release bearing and a pressure lever, varied according to wear of the friction disc, to the predetermined normal clearance, an automatic device for compensation for the wear of the friction disc, comprising a main control cylinder 3 enclosing a main tubular piston 6 and an auxiliary piston 8 enclosed in said main piston, oil pressure passages for connecting said control cylinder to a master cylinder, said main piston 6 and the auxiliary piston 8 being adapted to be acted upon by the oil pressure through said pressure oil passages respectively, a pressure rod 9 connected with said auxiliary piston 8, means provided in said main piston for suppressing the movement of the auxiliary piston in one direction relative to the main piston, and a spring 15 normally urging said pressure rod 9 in the direction to keep it in the position in which the clutch is engaged, the arrangement being such that upon stepping down of a clutch pedal when there is any wear of the friction disc the main piston is moved, and that the pressure oil acting upon the auxiliary piston is shut off when the said clearance becomes zero, so that the main piston as well as the auxiliary piston are moved in unison to disengage the clutch.

References Cited

UNITED STATES PATENTS 3,117,661   1/1964   Waclawek.
3,171,526   3/1965   Waclawek.

BENJAMIN W. WYCHE III, *Primary Examiner.*

U.S. Cl. X.R.

60—54.6; 192—91